(12) United States Patent
Lee et al.

(10) Patent No.: US 12,132,229 B2
(45) Date of Patent: Oct. 29, 2024

(54) LEAD TAB FOR SECONDARY BATTERY

(71) Applicant: NSM CO., LTD., Cheongju-si (KR)

(72) Inventors: Ki Ok Lee, Cheongju-si (KR); Min Gou Han, Cheongju-si (KR); Heang Sun Jung, Cheongju-si (KR)

(73) Assignee: NSM CO., LTD., Cheongju-si (KR)

( * ) Notice: Subject to any disclaimer, the term of this patent is extended or adjusted under 35 U.S.C. 154(b) by 450 days.

(21) Appl. No.: 17/728,237

(22) Filed: Apr. 25, 2022

(65) Prior Publication Data

US 2022/0344786 A1    Oct. 27, 2022

(30) Foreign Application Priority Data

Apr. 26, 2021   (KR) .................. 10-2021-0053524

(51) Int. Cl.
  *H01M 50/533* (2021.01)
  *H01M 50/534* (2021.01)
  *H01M 10/0525* (2010.01)

(52) U.S. Cl.
  CPC ....... *H01M 50/533* (2021.01); *H01M 50/534* (2021.01); *H01M 10/0525* (2013.01)

(58) Field of Classification Search
  CPC ............. H01M 50/503; H01M 50/533; H01M 50/534; H01M 50/536
  See application file for complete search history.

(56) References Cited

U.S. PATENT DOCUMENTS

| | | | |
|---|---|---|---|
| 2005/0287428 A1* | 12/2005 | Cheon ................. | H01M 50/528 429/211 |
| 2013/0280567 A1* | 10/2013 | Kwon .................... | H01M 6/40 429/153 |
| 2015/0147598 A1* | 5/2015 | Inoue .................. | H01M 50/574 429/7 |
| 2022/0052407 A1* | 2/2022 | Kim .................... | H01M 50/184 |

FOREIGN PATENT DOCUMENTS

KR    10-1586072 B1    1/2016

\* cited by examiner

*Primary Examiner* — Christopher P Domone
(74) *Attorney, Agent, or Firm* — Bridgeway IP Law Group, PLLC; Jihun Kim (57) ABSTRACT

A lead tab for a secondary battery may include a metal plate and a plurality of concavo-convex patterns formed on a surface of the metal plate. The plurality of concavo-convex patterns may be formed through a surface treatment of applying predetermined laser light energy onto the surface of the metal plate. The external energy may have an output value decided on the basis of the material of the metal plate, and the surface of the metal plate may be treated with the decided output value.

4 Claims, 8 Drawing Sheets

LEAD TAB FOR SECONDARY BATTERY

BACKGROUND

1. Technical Field

The present disclosure relates to a lead tab, and more particularly, to a lead tab for a secondary battery.

2. Related Art

In general, a secondary battery refers to a battery which can be repeatedly used through a discharging process of converting chemical energy into electrical energy and a charging process of converting electrical energy into chemical energy.

Examples of the secondary battery may include a nickel-cadmium (Ni—Cd) battery, a nickel-hydrogen (Ni—MH) battery, a lithium-metal battery, a lithium-ion (NLi—Ion) battery, and a lithium-ion (Li—Ion) Polymer Battery (hereafter, referred to as "LIPB").

Among the secondary batteries, the lithium secondary battery has a cycle life of about 500 or more times and a short charging time of about one or two hours, and is lighter by about 30 to 40% than the nickel-hydrogen battery, thereby making it possible to reduce the weight of a product. Furthermore, the lithium secondary battery has excellent energy density and the highest voltage per unit battery, which ranges from 3.0 to 3.7 V, among the existing secondary batteries. Thus, the lithium secondary battery may have characteristics optimized to mobile devices.

Such a lithium secondary battery may include an electrode assembly housed in a battery case, a lead tab electrically connected to electrode tabs of electrodes included in the electrode assembly and extended to the outside of the battery case, and an insulating film configured to electrically insulate the lead tab.

In particular, the insulating film may have one surface fused to the lead tab and the other surface corresponding to the opposite surface of the one surface and fused to the battery case, and may perform a function of sealing the interface between the lead tab and the electrode case.

However, since the lead tab and the insulating film are made of different materials, there is a limitation in reliably fusing the insulating film to the lead tab.

In the related art, the surface of the lead tab has been chemically treated with a chemical, in order to improve the fusion performance between the lead tab and the insulating film.

However, the existing surface treatment technology may cause an environmental pollution problem because a toxic substance may be contained in the chemical used to treat the surface of the lead tab. In addition, the existing surface treatment technology may require a long time to treat the surface of the lead tab, thereby reducing the productivity of the secondary battery.

Therefore, there is a need for the development of a lead tab which can improve the fusion performance between the lead tab and an insulating film without using a chemical, and thus minimize the environmental pollution and the defect rate while raising the productivity.

RELATED ART DOCUMENT

Patent Document

Korean Patent No. 10-1586072 (registered on Jan. 19, 2016)

SUMMARY

Various embodiments are directed to a lead tab for a secondary battery, in which a plurality of concave-concavo patterns for increasing the surface area of the lead tab are formed by treating the surface of the lead tab with external energy, and thus can improve the fusion performance between the lead tab and an insulating film without using a chemical, which makes it possible to minimize the environmental pollution and the defect rate while raising the productivity.

The technical problems of the present disclosure are not limited to the above-described problems, and other technical problems which are not described will be clearly understood from the following descriptions by those skilled in the art to which the present disclosure pertains.

In an embodiment of the present disclosure, a lead tab for a secondary battery may include a metal plate and a plurality of concavo-convex patterns formed on a surface of the metal plate. The plurality of concavo-convex patterns may be formed through a surface treatment of applying predetermined external energy onto the surface of the metal plate.

In an alternative embodiment of the lead tab for a secondary battery, the external energy may be laser light energy.

In an alternative embodiment of the lead tab for a secondary battery, the external energy may have an output value decided on the basis of the material of the metal plate, and the surface of the metal plate may be treated with the decided output value.

In an alternative embodiment of the lead tab for a secondary battery, the surface of the metal plate may be treated with the external energy having a first output value when the metal plate is made of a single metal, and the surface of the metal plate may be treated with the external energy having a second output value when the metal plate is made of a composite metal.

In an alternative embodiment of the lead tab for a secondary battery, the external energy may have an output value decided on the basis of preset surface roughness of the metal plate, and the surface of the metal plate may be treated with the decided output value.

In an alternative embodiment of the lead tab for a secondary battery, the external energy may be applied to any one surface region of front and rear surfaces of the metal plate, in order to form the plurality of concavo-convex patterns.

In an alternative embodiment of the lead tab for a secondary battery, the external energy having the first output value may be applied onto the front surface of the metal plate so as to form first concavo-convex patterns, and the external energy having the second output value may be applied onto the rear surface of the metal plate so as to form second concavo-convex patterns.

In an alternative embodiment of the concavo-convex pattern may include at least one pattern among a dot pattern, a line pattern, a lattice pattern, and combinations thereof.

In an alternative embodiment of the lead tab for a secondary battery, the concavo-convex patterns adjacent to each other may have a spacing of about 0.001 mm to about 0.5 mm therebetween.

In an alternative embodiment of the lead tab for a secondary battery, the concavo-convex patterns may have an etching depth ranging from about 1% to about 80% of the total thickness of the metal plate.

In an alternative embodiment of the lead tab for a secondary battery, the area of the concavo-convex patterns may range from about 10% to about 95% of the total area of the metal plate.

In an alternative embodiment of the lead tab for a secondary battery, the concavo-convex patterns may be formed only in a partial region of the metal plate.

In an alternative embodiment of the lead tab for a secondary battery, the concavo-convex patterns may be located between an end and a central region of the metal plate.

In an alternative embodiment of the lead tab for a secondary battery, the metal plate may be formed of a single metal layer, and the concavo-convex patterns may be formed on the surface of the single metal layer.

In an alternative embodiment of the lead tab for a secondary battery, the metal plate may be composed of a first metal layer and a second metal layer plated on the surface of the first metal layer, and the concavo-convex patterns may be formed on the surface of the second metal layer.

The effects of the lead tab for a secondary battery according to the present disclosure will be described as follows.

According to the present disclosure, the plurality of concavo-convex patterns for increasing the surface area of the lead tab may be formed by treating the surface of the lead tab with external energy, and thus improve the fusion performance between the lead tab and the insulating film without using a chemical, which makes it possible to minimize the environmental pollution and the defect rate while raising the productivity.

Furthermore, the concavo-convex patterns may be formed on the surface of the processing area of the lead tab, to which the insulating film is fused or bonded, such that the surface area of the fused or bonded surface of the lead tab is increased, which makes it is possible to improve the fusion or bonding performance between the insulating film and the processing area of the lead tab.

Furthermore, when the insulating films are fused or bonded, bubbles formed at the interfaces between the insulating films and the processing area of the lead tab may be discharged to the outside through the concavo-convex patterns, which makes it possible to prevent the bubbles from being contained in the interfaces.

The additional range of the applicability of the present disclosure will be apparent from the following detailed descriptions. However, since various modifications and amendments within the sprit and scope of the present disclosure can be clearly understood by those skilled in the art, it should be understood that specific embodiments such as preferred embodiments in the detailed descriptions and the present disclosure are presented as only examples.

DETAILED DESCRIPTION

Hereafter, the present disclosure will be described in more detail with reference to the drawings.

Terms such as "module" and "unit" for components used in the following descriptions are simply given in consideration of the ease of writing this specification, and the "module" and the "unit" may be interchangeably used.

Furthermore, although embodiments of the present disclosure will be described in detail with reference to the accompanying drawings and contents described in the drawings, the present disclosure is not limited to the embodiments.

In this specification, general terms which are widely used at the moment are selected as the terms used herein in consideration of functions in the present disclosure. However, the terms may be changed depending on the intention of technician in the art, practice or an appearance of new technique. In a specific case, a term selected by the present applicant may be used. In this case, the meaning of the term will be described in the corresponding part of this specification. Therefore, the definitions of the terms used herein should be made not by the names of the terms, but by the substantial meanings of the terms based on the overall disclosures set forth herein.

Figure 1:
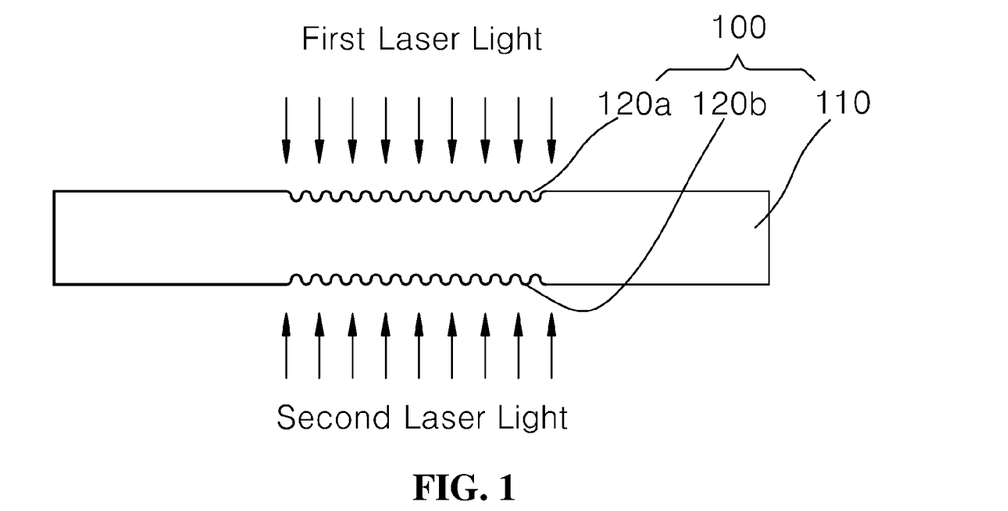
FIG. 1 is a diagram for describing a lead tab according to an embodiment of the present disclosure.
Figure 2:
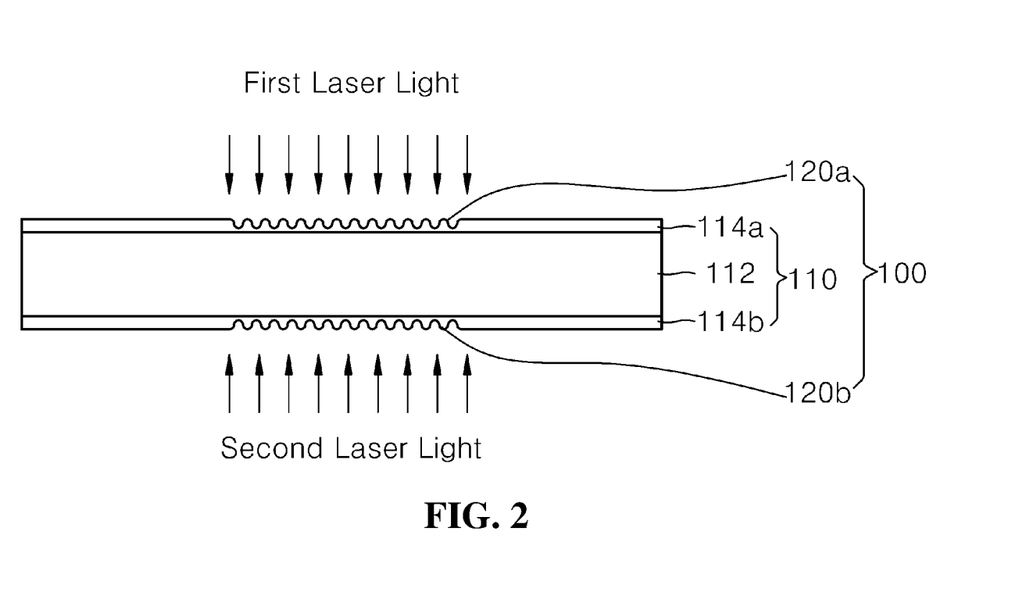
FIG. 2 is a diagram for describing a lead tab according to another embodiment of the present disclosure.

FIG. 1 is a diagram for describing a lead tab according to an embodiment of the present disclosure, and FIG. 2 is a diagram for describing a lead tab according to another embodiment of the present disclosure.

FIG. 1 illustrates the lead tab for a positive electrode, and FIG. 2 illustrates the lead tab for a negative electrode.

As illustrated in FIGS. 1 and 2, a lead tab 100 according to the present disclosure may include a metal plate 110 and a plurality of concavo-convex patterns 120 formed on the surface of the metal plate 110.

The plurality of concavo-convex patterns 120 may be formed through a surface treatment of applying predetermined external energy onto the surface of the metal plate 110.

For example, the external energy may be laser light energy, but is not limited thereto.

Furthermore, the external energy may have an output value decided on the basis of the material of the metal plate 110, and the surface of the metal plate 110 may be treated with the external energy having the decided output value.

That is, the surface of the metal plate 110 may be treated with the external energy having a first output value, when the metal plate 110 is made of a single metal, and the surface of the metal plate 110 may be treated with the external energy having a second output value, when the metal plate 110 is made of a composite metal.

The first and second output values of the external energy may be equal to each other.

In some cases, the first and second output values of the external energy may be different from each other.

At this time, the second output value of the external energy may be larger than the first output value of the external energy.

For example, the surface of the metal plate 110 may be treated with the external energy having the first output value, when the metal plate 110 is made of a single metal of aluminum (Al), and the surface of the metal plate 110 may be treated with the external energy having the second output value, when the metal plate 110 is made of a composite metal of nickel and copper (NiCu).

In this case, the second output value of the external energy may be larger than the first output value of the external energy.

The output value of the external energy may be decided on the basis of preset surface roughness of the metal plate 110, and the surface of the metal plate 110 may be treated with the external energy having the decided output value.

For example, the surface roughness of the metal plate 110 may be set in advance, and the output value of the external energy may be decided according to the surface roughness. Then, the external energy having the decided output value may be emitted onto the surface of the metal plate 110, in order to form the concavo-convex patterns 120 on the surface of the metal plate 110 such that the metal plate 110 has the set surface roughness.

The external energy may be applied to at least one surface of the front and rear surfaces of the metal plate 110, in order to form the plurality of concavo-convex patterns 120.

At this time, the external energy having the first output value may be applied onto the front surface of the metal plate 110 so as to form first concavo-convex patterns 120a, and the external energy having the second output value may be applied onto the rear surface of the metal plate 110 so as to form second concavo-convex patterns 120b.

In this case, the first output value of the external energy may be equal to the second output value of the external energy.

In some cases, the first output value of the external energy may be different from the second output value of the external energy.

For example, according to the present disclosure, first laser light having the first output value may be emitted onto the front surface of the metal plate 110 so as to form the first concavo-convex patterns 120a, and second laser light having the second output value may be emitted onto the rear surface of the metal plate 110 so as to form the second concavo-convex patterns 120b.

Furthermore, the first concavo-convex patterns 120a formed on the front surface of the metal plate 110 may be the same as the second concavo-convex patterns 120b formed on the rear surface of the metal plate 110.

In some cases, the first concavo-convex patterns 120a formed on the front surface of the metal plate 110 may be different from the second concavo-convex patterns 120b formed on the rear surface of the metal plate 110.

Furthermore, the spacing between the first concavo-convex patterns 120a may be different from the spacing between the second concavo-convex patterns 120b.

In some cases, the spacing between the first concavo-convex patterns 120a may be equal to the spacing between the second concavo-convex patterns 120b.

Furthermore, the size of the first concavo-convex pattern 120a may be different from the size of the second concavo-convex pattern 120b.

In some cases, the size of the first concavo-convex pattern 120a may be equal to the size of the second concavo-convex pattern 120b.

Furthermore, the first concavo-convex patterns 120a may be arranged according to a different arrangement rule from that of the second concavo-convex patterns 120b.

In some cases, the first concavo-convex patterns 120a may be arranged according to the same arrangement rule as that of the second concavo-convex patterns 120b.

Furthermore, the roughness value of the front surface of the metal plate 110 on which the first concavo-convex patterns 120a are formed may be different from that of the rear surface of the metal plate 110 on which the second concavo-convex patterns 120b are formed.

In some cases, the roughness value of the front surface of the metal plate 110 on which the first concavo-convex patterns 120a are formed may be equal to the roughness value of the rear surface of the metal plate 110 on which the second concavo-convex patterns 120b are formed.

The concavo-convex pattern 120 may include at least one pattern among a dot pattern, a line pattern, a lattice pattern, and combinations thereof, but is not limited thereto.

The concavo-convex patterns 120 adjacent to each other may have a spacing of about 0.001 mm to about 0.5 mm therebetween.

The concavo-convex patterns 120 may have an etching depth ranging from about 1% to about 80% of the total thickness of the metal plate 110.

Furthermore, the area of the concavo-convex patterns 120 may range from about 10% to about 95% of the total area of the metal plate 110.

The concavo-convex patterns 120 may be formed only in a partial region of the metal plate 110.

In this case, the concavo-convex patterns 120 may be located between an end and a central region of the metal plate 110.

For example, the concavo-convex patterns 120 may be formed in the widthwise direction of the metal plate 110, and have a stripe shape.

As illustrated in FIG. 1, the metal plate 110 of the lead tab 100 for a positive electrode may be formed of a single metal layer, and the concavo-convex patterns 120 may be formed on the surface of the single metal layer.

For example, the metal plate 110 may be formed of an Al layer, and the concavo-convex patterns 120 may be formed on the surface of the Al layer.

Furthermore, as illustrated in FIG. 2, the metal plate 110 of the lead tab 100 for a negative electrode may be composed of a first metal layer 112 and a second metal layer 114 plated on the surface of the first metal layer 112, and the concavo-convex patterns 120 may be formed on the surface of the second metal layer 114.

The second metal layer 114 may include a second metal layer 114a plated on the top surface of the first metal layer 112 and a second metal layer 114b plated on the bottom surface of the first metal layer 112.

For example, the metal plate 110 may be composed of a Cu layer and a Ni layer plated on the surface of the Cu layer, and the concavo-convex patterns 120 may be formed on the surface of the Ni layer.

The concavo-convex pattern 120 may have a depth equal to or smaller than the thickness of the second metal layer 114.

In some cases, the concavo-convex pattern 120 may have a depth equal to or larger than the thickness of the second metal layer 114.

According to the present disclosure, the plurality of concavo-convex patterns for increasing the surface area of the lead tab may be formed by treating the surface of the lead tab with external energy, and thus improve the fusion performance between the lead tab and the insulating film without using a chemical, which makes it possible to minimize the environmental pollution and the defect rate while raising the productivity.

Furthermore, the concavo-convex patterns may be formed on the surface of the processing area of the lead tab, to which the insulating film is fused or bonded, such that the surface area of the fused or bonded surface of the lead tab is increased, which makes it is possible to improve the fusion or bonding performance between the insulating film and the processing area of the lead tab.

Furthermore, when the insulating films are fused or bonded, bubbles formed at the interfaces between the insulating films and the processing area of the lead tab may be discharged to the outside through the concavo-convex patterns, which makes it possible to prevent the bubbles from being contained in the interfaces.

Figure 3A:
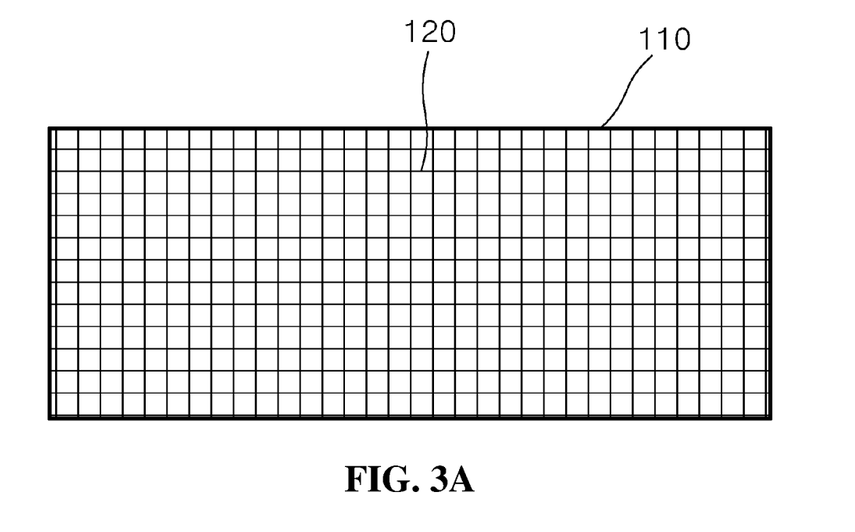
FIGS. 3A to 3C are diagrams for describing concavo-convex patterns according to the present disclosure.
Figure 3B:
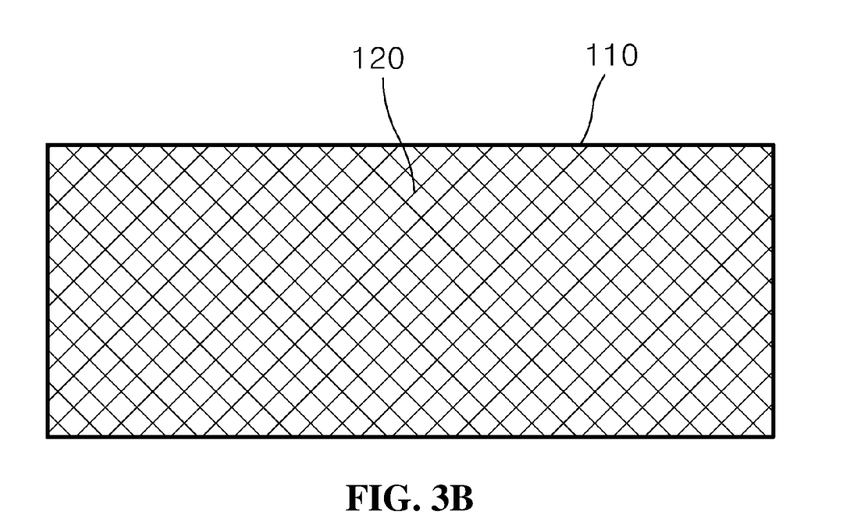
Figure 3C:
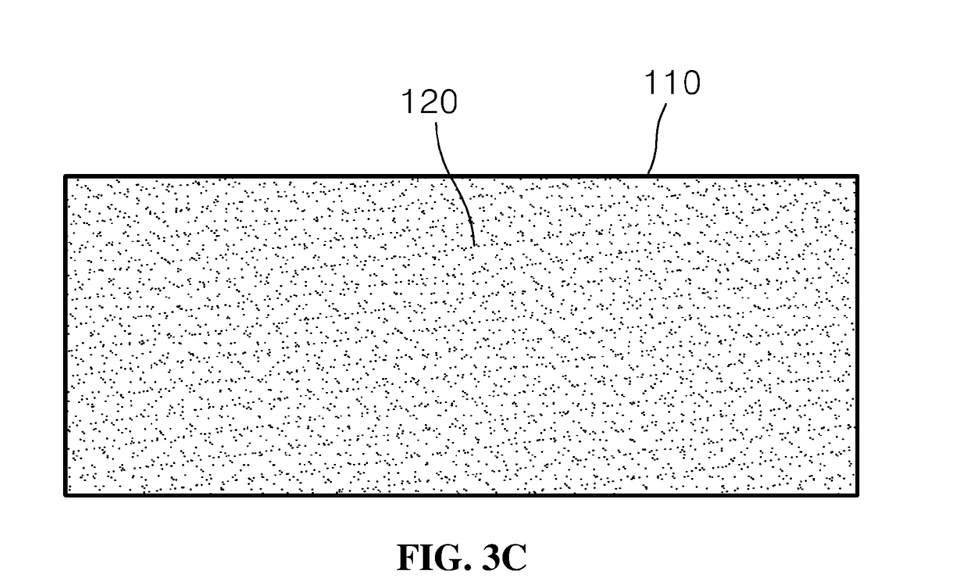

FIGS. 3A to 3C are diagrams for describing concavo-convex patterns according to the present disclosure.

As illustrated in FIGS. 3A to 3C, the lead tab according to the present disclosure may have the plurality of concavo-convex patterns 120 formed on the surface of the metal plate 110.

The plurality of concavo-convex patterns 120 may be formed through a surface treatment of applying predetermined external energy such as laser light onto the surface of the metal plate 110.

As illustrated in FIG. 3A, the concavo-convex patterns 120 may be formed as line patterns or formed as lattice patterns as illustrated in FIG. 3B, or formed as dot patterns as illustrated in FIG. 3C.

In some cases, the concavo-convex patterns 120 may be formed as a pattern combination including dot patterns, line patterns, and lattice patterns.

The spacing between the concavo-convex patterns 120 adjacent to each other may range from about 0.001 mm to about 0.5 mm, the etching depth of the concavo-convex patterns 120 may range from about 1% to about 80% of the total thickness of the metal plate 110, and the area of the concavo-convex patterns 120 may range from about 10% to about 95% of the total area of the metal plate 110. However, the present disclosure is not limited thereto.

Figure 4:
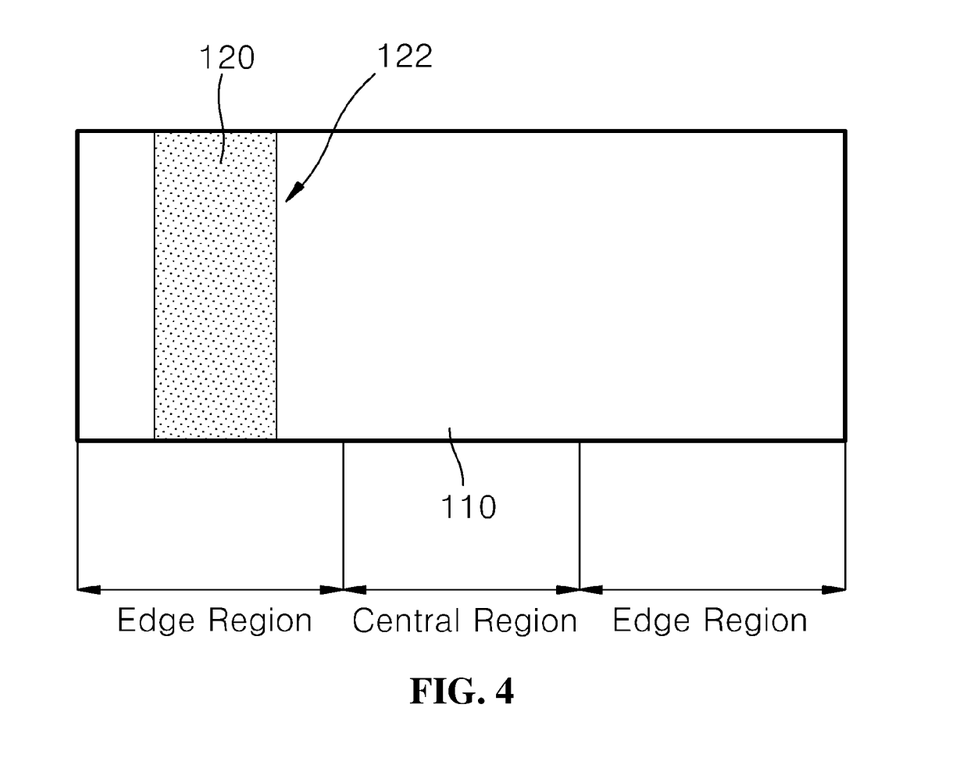
FIG. 4 is a diagram for describing the position of the concave-convex patterns according to the present disclosure.

FIG. 4 is a diagram for describing the position of the concave-convex patterns according to the present disclosure.

As illustrated in FIG. 4, the concavo-convex patterns 120 may be formed only in a partial region of the metal plate 110.

In this case, the concavo-convex patterns 120 may be located between an end and a central region of the metal plate 110.

For example, the formation region 122 of the concavo-convex patterns 120 may be formed in the widthwise direction of the metal plate 110, and have a stripe shape. However, the present disclosure is not limited thereto.

Furthermore, the concavo-convex patterns 120 may be formed with a uniform depth in a predetermined region of the metal plate 110.

For example, the concavo-convex patterns 120 may be formed with a depth ranging from 1% to 80% of the thickness of the metal plate 110.

In some cases, the concavo-convex patterns 120 may be formed with non-uniform depths in a predetermined region of the metal plate 110.

In this case, the concavo-convex patterns 120 formed in an edge region of the predetermined region of the metal plate 110 may have a larger depth than the concavo-convex patterns 120 formed in the central region of the predetermined region of the metal plate 110.

In a different case, the depths of the concavo-convex patterns 120 gradually increase from the central region toward the edge region in the predetermined region.

Furthermore, the concavo-convex patterns 120 may be formed in the entire predetermined region of the metal plate 110.

In some cases, the concavo-convex patterns 120 may be formed only in a part of the predetermined region of the metal plate 110.

For example, the area of the concavo-convex patterns may range from 10% to 95% of the total area in the predetermined region of the metal plate 110.

Furthermore, the concavo-convex patterns 120 may be formed in plurality in the predetermined region of the metal plate 110, and the concavo-convex patterns adjacent to each other may have a uniform spacing distance therebetween.

In some cases, the concavo-convex patterns 120 may be formed in plurality in the predetermined region of the metal plate 110, and the concavo-convex patterns adjacent to each other may have a non-uniform spacing distance therebetween.

At this time, the spacings between the concavo-convex patterns adjacent to each other may gradually decrease from the central region toward the edge region in the predetermined region.

Figure 5:
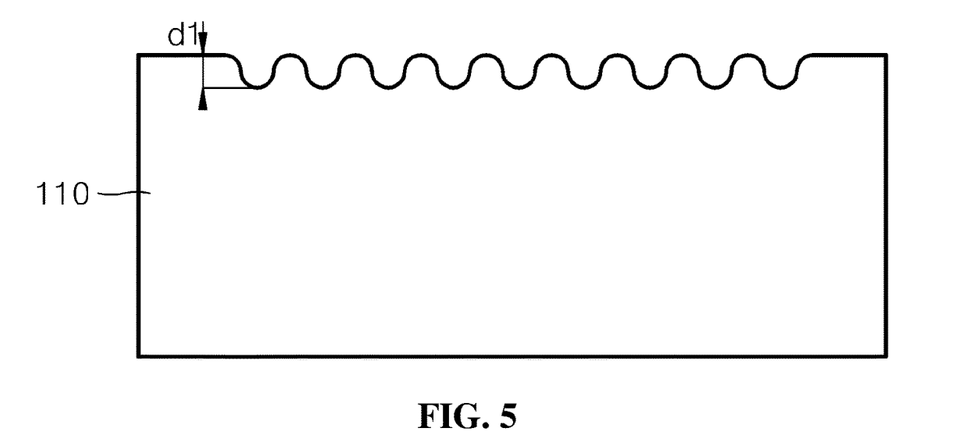
FIG. 5 is a diagram for describing the depth of the concavo-convex patterns formed in the lead tab of FIG. 1.

FIG. 5 is a diagram for describing the depth of the concavo-convex patterns formed in the lead tab of FIG. 1.

As illustrated in FIG. 5, the metal plate 110 of the lead tab for a positive electrode may be formed of a single metal layer, and the concavo-convex patterns 120 may be formed on the surface of the single metal layer.

For example, the metal plate 110 may be formed of an Al layer, and the concavo-convex patterns 120 may be formed on the surface of the Al layer.

The concavo-convex patterns 120 may have an etching depth $d1$ ranging from about 1% to about 80% of the total thickness of the metal plate 110, but is not limited thereto.

Figure 6A:
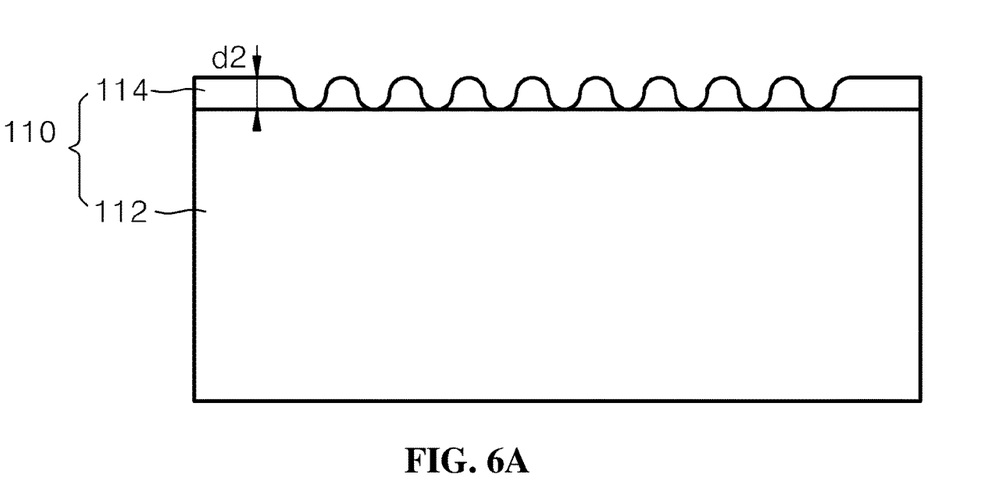
FIGS. 6A and 6B are diagrams for describing the depth of the concavo-convex patterns formed in the lead tab of FIG. 2.
Figure 6B:
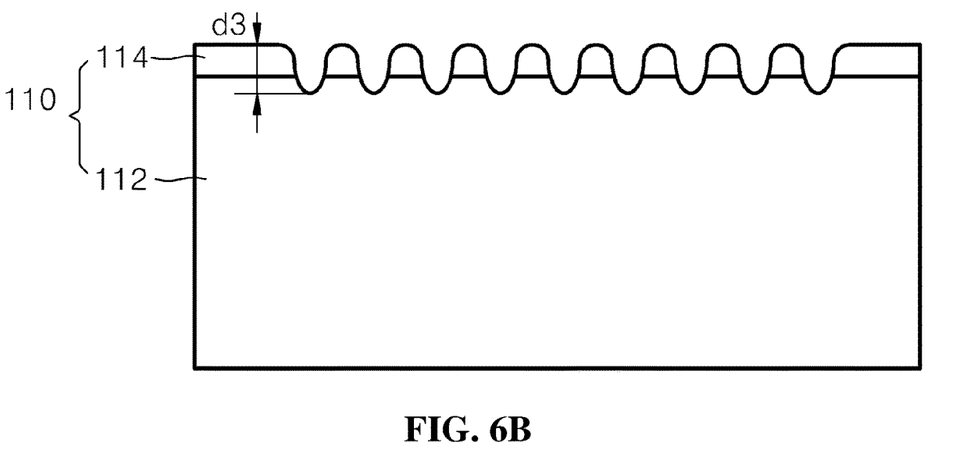

FIGS. 6A and 6B are diagrams for describing the depth of the concavo-convex patterns formed in the lead tab of FIG. 2.

As illustrated in FIGS. 6A and 6B, the metal plate 110 of the lead tab for a negative electrode may be composed of the first metal layer 112 and the second metal layer 114 plated on the first metal layer 112, and the concavo-convex patterns 120 may be formed on the surface of the second metal layer 114.

For example, the metal plate 110 may be composed of a Cu layer and a Ni layer plated on the surface of the Cu layer, and the concavo-convex patterns 120 may be formed on the surface of the Ni layer.

As illustrated in FIG. 6A, the concavo-convex patterns 120 may have a depth $d2$ equal to or smaller than the thickness of the second metal layer 114.

In some cases, as illustrated in FIG. 6B, the concavo-convex patterns 120 may have a depth $d3$ equal to or larger than the thickness of the second metal layer 114.

Figure 7:
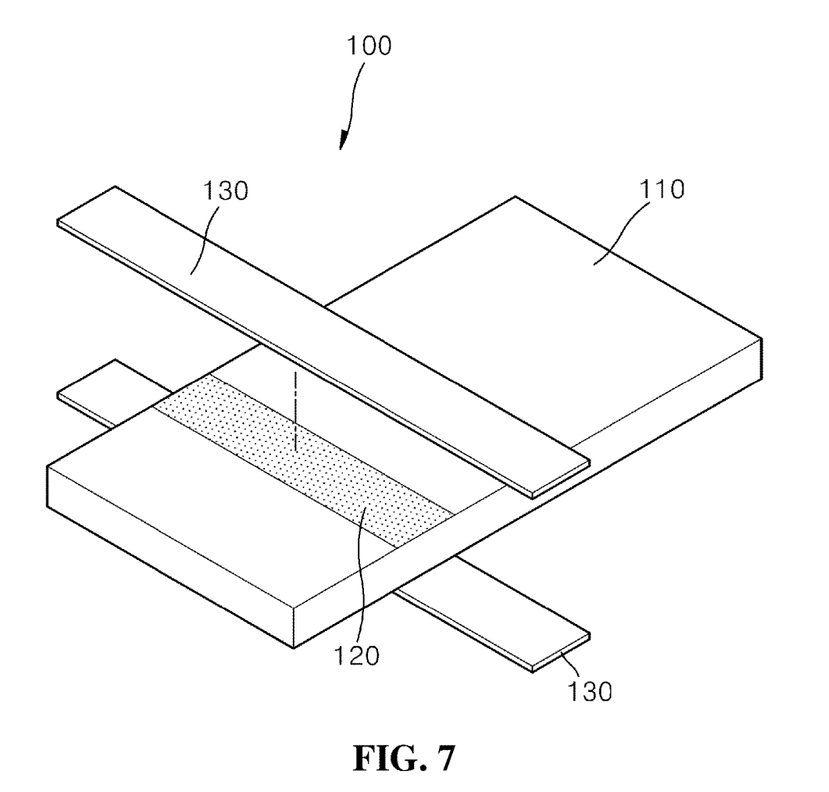
FIGS. 7 and 8 are diagrams for describing a lead tab according to another embodiment of the present disclosure.
Figure 8:
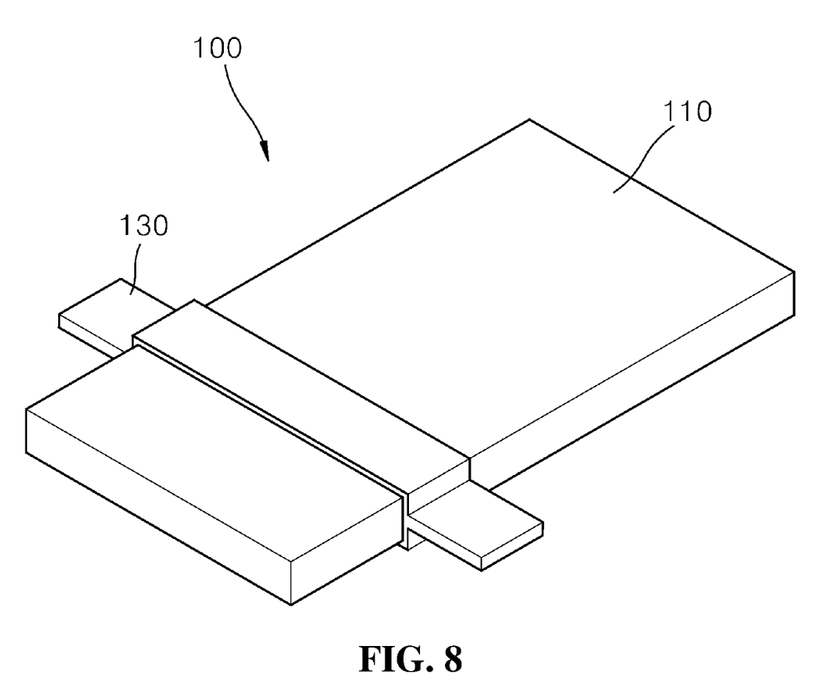

FIGS. 7 and 8 are diagrams for describing a lead tab according to another embodiment of the present disclosure.

As illustrated in FIGS. 7 and 8, a lead tab 100 according to the present disclosure may include a metal plate 110, an insulating film 130 bonded to the metal plate 110, and a plurality of concavo-convex patterns 120 formed on a surface region of the metal plate 110, to which the insulating film 130 is bonded.

The plurality of concavo-convex patterns 120 may be formed through a surface treatment of emitting laser light onto the surface region of the metal plate 110, to which the insulating film 130 is bonded.

The concavo-convex patterns 120 may be located between an end and a central region of the metal plate 110.

Furthermore, the concavo-convex patterns 120 may be formed in the widthwise direction of the metal plate 110, and have a stripe shape like the shape of the insulating film 130.

The concavo-convex patterns 120 may have an area equal to or smaller than the contact area between the metal plate 110 and the insulating film 130.

The concavo-convex pattern 120 may be formed in at least one pattern among a dot pattern, a line pattern, a lattice pattern, and combinations thereof, but is not limited thereto.

The concavo-convex patterns 120 adjacent to each other may have a spacing of about 0.001 mm to about 0.5 mm therebetween.

The concavo-convex patterns 120 may have an etching depth ranging from about 1% to about 80% of the total thickness of the metal plate 110.

Furthermore, the area of the concavo-convex patterns 120 may range from about 10% to about 95% of the total area of the metal plate 110.

The concavo-convex patterns 120 may include first concavo-convex patterns formed on the front surface of the metal plate 110 and second concavo-convex patterns formed on the rear surface of the metal plate 110.

The first concavo-convex patterns may be formed at the same position as the second concavo-convex patterns.

Furthermore, the first concavo-convex patterns and the second concavo-convex patterns may face each other with the metal plate 110 interposed therebetween.

In addition, the first concavo-convex patterns formed on the front surface of the metal plate 110 may be the same shape as the second concavo-convex patterns formed on the rear surface of the metal plate 110.

In some cases, the first concavo-convex patterns formed on the front surface of the metal plate 110 may have a different shape from the second concavo-convex patterns formed on the rear surface of the metal plate 110.

The spacing between the first concavo-convex patterns may be different from the spacing between the second concavo-convex patterns.

In some cases, the spacing between the first concavo-convex patterns may be equal to the spacing between the second concavo-convex patterns.

Furthermore, the first concavo-convex pattern may have a different size from the second concavo-convex pattern.

In some cases, the first concavo-convex pattern may have the same size as the second concavo-convex pattern.

Furthermore, the first concavo-convex patterns may be arranged according to a different arrangement rule from that of the second concavo-convex patterns.

In some cases, the first concavo-convex patterns may be arranged according to the same arrangement rule as that of the second concavo-convex patterns.

Furthermore, the roughness value of the front surface of the metal plate 110 on which the first concavo-convex patterns are formed may be different from that of the rear surface of the metal plate 110 on which the second concavo-convex patterns are formed.

In some cases, the roughness value of the front surface of the metal plate 110 on which the first concavo-convex patterns are formed may be equal to that of the rear surface of the metal plate 110 on which the second concavo-convex patterns are formed.

The area of the first concavo-convex patterns formed on the front surface of the metal plate 110 may be equal to that of the second concavo-convex patterns formed on the rear surface of the metal plate 110.

In some cases, the area of the first concavo-convex patterns formed on the front surface of the metal plate 110 may be different from that of the second concavo-convex patterns formed on the rear surface of the metal plate 110.

The laser light may have an output value decided on the basis of the material of the metal plate 110, and the surface of the metal plate 110 may be treated with the laser light having the decided output value.

That is, the surface of the metal plate 110 may be treated with the laser light having a first output value, when the metal plate 110 is made of a single metal, and the surface of the metal plate 110 may be treated with the laser light having a second output value, when the metal plate 110 is made of a composite metal.

In this case, the first and second output values of the laser light may be equal to each other.

In some cases, the first and second output values of the laser light may be different from each other.

At this time, the second output value of the laser light may be larger than the first output value of the laser light.

For example, the surface of the metal plate 110 may be treated with the laser light having the first output value, when the metal plate 110 is made of Al, and the surface of the metal plate 110 may be treated with the laser light having the second output value, when the metal plate 110 is made of NiCu.

In this case, the second output value of the laser light may be larger than the first output value of the laser light.

The output value of the laser light may be decided on the basis of preset surface roughness of the metal plate 110, and the surface of the metal plate 110 may be treated with the laser light having the decided output value.

For example, the surface roughness of the metal plate 110 may be set in advance, and the output value of the laser light may be decided according to the surface roughness. Then, the laser light having the decided output value may be emitted onto the surface of the metal plate 110, in order to form the concavo-convex patterns 120 on the surface of the metal plate 110 such that the metal plate 110 has the set surface roughness.

The laser light may be applied to at least one surface of the front and rear surfaces of the metal plate 110, in order to form the plurality of concavo-convex patterns 120.

At this time, the laser light having the first output value may be applied onto the front surface of the metal plate 110 so as to form first concavo-convex patterns, and the laser light having the second output value may be applied onto the rear surface of the metal plate 110 so as to form second concavo-convex patterns.

In this case, the first output value of the laser light may be equal to the second output value of the laser light.

In some cases, the first output value of the laser light may be different from the second output value of the laser light.

For example, according to the present disclosure, first laser light having the first output value may be emitted onto the front surface of the metal plate 110 so as to form the first concavo-convex patterns, and second laser light having the second output value may be emitted onto the rear surface of the metal plate 110 so as to form the second concavo-convex patterns.

When the lead tab 100 according to the present disclosure is applied to a positive electrode, the metal plate 110 may be formed of a single metal layer, and the concavo-convex patterns 120 may be formed on the surface of the single metal layer.

For example, the metal plate 110 may be formed of an Al layer, and the concavo-convex patterns 120 may be formed on the surface of the Al layer.

When the lead tab according to the present disclosure is applied to a negative electrode, the metal plate 110 may be composed of a first metal layer and a second metal layer plated on the surface of the first metal layer, and the concavo-convex patterns 120 may be formed on the surface of the second metal layer.

The second metal layer may include a second metal layer plated on the top surface of the first metal layer and a second metal layer plated on the bottom surface of the first metal layer.

For example, the metal plate 110 may be composed of a Cu layer and a Ni layer plated on the surface of the Cu layer, and the concavo-convex patterns 120 may be formed on the surface of the Ni layer.

The concavo-convex patterns 120 may have a depth equal to or smaller than the thickness of the second metal layer.

In some cases, the concavo-convex patterns 120 may have a depth equal to or larger than the thickness of the second metal layer.

The concavo-convex patterns 120 of the lead tab 100 according to the present disclosure may be coated with a coating solution.

In an embodiment of the present disclosure, the lead tab 100 having the concavo-convex patterns 120 formed thereon may be dipped into a coating solution for a predetermined time, such that the concavo-convex patterns 120 are coated with the coating solution.

In another embodiment of the present disclosure, a sprayer may be used to spray a coating solution onto the region where the concavo-convex patterns 120 are formed, such that the concavo-convex patterns 120 are coated with the coating solution.

In still another embodiment of the present disclosure, a brush may be used to apply a coating solution onto the region where the concavo-convex patterns 120 are formed, such that the concavo-convex patterns 120 are coated with the coating solution.

After the concavo-convex patterns 120 are coated with the coating solution, the lead tab 100 may be dried for a predetermined time.

Then, the insulating film 130 may be bonded onto the concavo-convex patterns 120 coated with the coating solution.

According to the present disclosure, the lead tab 100 may be cut into preset sizes before the concavo-convex patterns 120 are formed.

In some cases, the lead tab 100 may be cut into preset sizes, before the coating solution is applied after the concavo-convex patterns 120 are formed.

In a different case, when the concavo-convex patterns 120 are coated with the coating solution, the lead tab 100 may be cut into preset sizes.

In this case, when the lead tab 100 is cut into the preset sizes, cutting positions of the lead tab 100 may be scanned and decided on the basis of the concavo-convex patterns 120, and the lead tab 100 may be cut on the basis of the decided cutting positions.

According to the present disclosure, the plurality of concavo-convex patterns for increasing the surface area of the lead tab may be formed by treating the surface of the lead tab, to which the insulating film is bonded or fused, with laser light, and thus improve the fusion performance between the lead tab and the insulating film without using a chemical, which makes it possible to minimize the environmental pollution and the defect rate while raising the productivity.

Furthermore, the laser-etched patterns may be formed on the surface of the processing area of the lead tab to which the insulating film is fused or bonded, in order to increase the surface area of the fused or bonded surface of the lead tab. Thus, it is possible to improve the fusion or bonding performance between the insulating film and the processing region of the lead tab.

Furthermore, when the insulating films are fused or bonded, bubbles generated at the interfaces between the insulating films and the processing area of the lead tab may be discharged to the outside through the laser-etched patterns, which makes it possible to prevent the bubbles from being contained in the interfaces.

Figure 9:
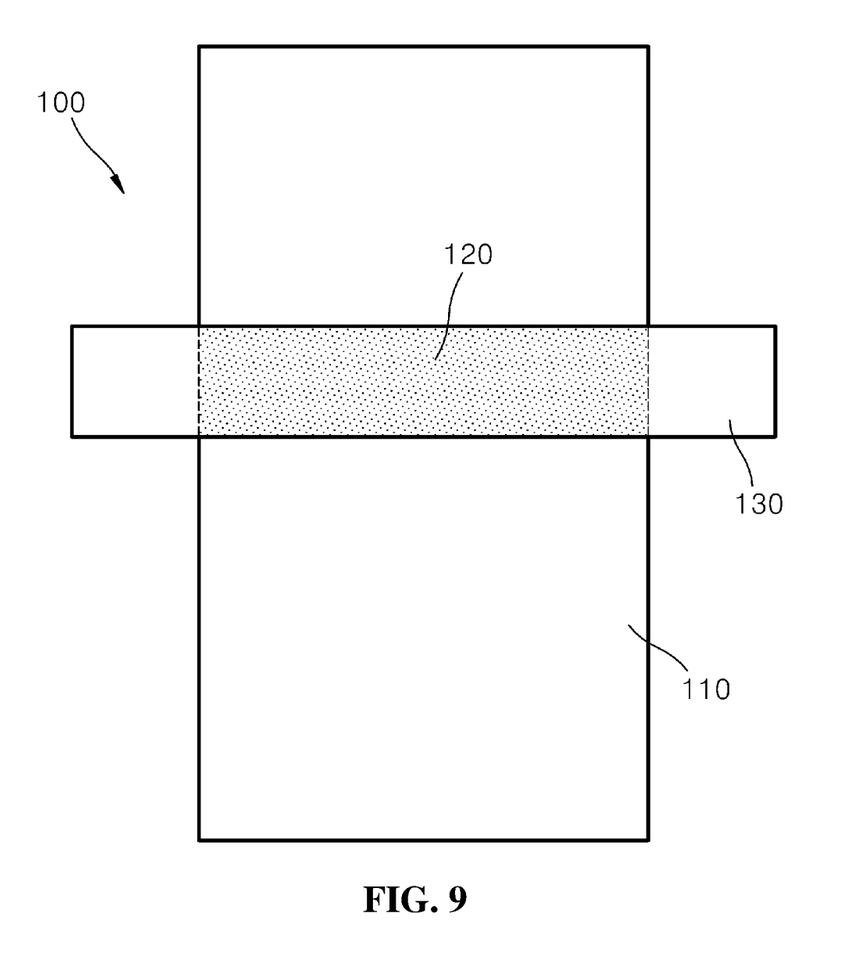
FIG. 9 is a diagram for describing the area of the concave-convex patterns according to the present disclosure.

FIG. 9 is a diagram for describing the area of the concave-convex patterns according to the present disclosure.

As illustrated in FIG. 9, the concavo-convex patterns 120 may be formed only in a partial region of the metal plate 110.

In this case, the concavo-convex patterns 120 may be located between an end and a central region of the metal plate 110.

For example, the formation region 122 of the concavo-convex patterns 120 may be formed in the widthwise direction of the metal plate 110, and have a stripe shape. However, the present disclosure is not limited thereto.

Furthermore, the area of the concavo-convex patterns 120 may be equal to or smaller than the contact area between the metal plate 110 and the insulating film 130.

That is, the width of the concavo-convex patterns 120 may be equal to or smaller than the width of the insulating film 130.

That is because, when the concavo-convex patterns 120 are formed to have a larger width than the insulating film 130, the resultant structure becomes inefficient, and when the concavo-convex patterns 120 are formed to have a too small width, a surface area corresponding to the bonded or fused surface is so small that the bonding or fusion efficiency may be degraded.

Furthermore, the concavo-convex patterns 120 may be formed with a uniform depth in a predetermined region of the metal plate 110.

For example, the concavo-convex patterns 120 may be formed with a depth ranging from 1% to 80% of the thickness of the metal plate 110.

In some cases, the concavo-convex patterns 120 may be formed with non-uniform depths in a predetermined region of the metal plate 110.

In this case, the concavo-convex patterns 120 formed at an edge region of the predetermined region of the metal plate 110 may have a larger depth than the concavo-convex patterns 120 formed in the central region of the predetermined region of the metal plate 110.

In a different case, the concavo-convex patterns 120 may be formed in the predetermined region of the metal plate 110 such that the depths of the concavo-convex patterns 120 gradually increase from the central region toward the edge region in the predetermined region.

Furthermore, the concavo-convex patterns 120 may be formed in the entire predetermined region of the metal plate 110.

In some cases, the concavo-convex patterns 120 may be formed only in a part of the predetermined region of the metal plate 110.

For example, the area of the concavo-convex patterns 120 formed in the predetermined region may range from 10% to 95% of the total area of the metal plate 110.

Furthermore, the concavo-convex patterns 120 may be formed in the predetermined region of the metal plate 110, and the concavo-convex patterns adjacent to each other may have a uniform spacing therebetween.

In some cases, the concavo-convex patterns 120 may be formed in the predetermined region of the metal plate 110, and the concavo-convex patterns adjacent to each other may have a non-uniform spacing therebetween.

At this time, the concavo-convex patterns 120 may be formed in the predetermined region of the metal plate 110 such that the spacings between the concavo-convex patterns adjacent to each other gradually decrease from the central region toward the edge region in the predetermined region.

The concavo-convex patterns 120 of the lead tab 100 according to the present disclosure may be coated with a coating solution.

In an embodiment of the present disclosure, the lead tab 100 having the concavo-convex patterns 120 formed thereon may be dipped into a coating solution for a predetermined time, such that the concavo-convex patterns 120 are coated with the coating solution.

In another embodiment of the present disclosure, a sprayer may be used to spray a coating solution onto the around where the concavo-convex patterns 120 are formed, such that the concavo-convex patterns 120 are coated with the coating solution.

In still another embodiment of the present disclosure, a brush may be used to apply a coating solution onto the around where the concavo-convex patterns 120 are formed, such that the concavo-convex patterns 120 are coated with the coating solution.

Furthermore, when the concavo-convex patterns 120 of the lead tab 100 are coated with the coating solution, the lead tab 100 may be dried for a predetermined time, and then the insulating film 130 may be bonded onto the concavo-convex patterns 120 coated with the coating solution.

Figure 10:
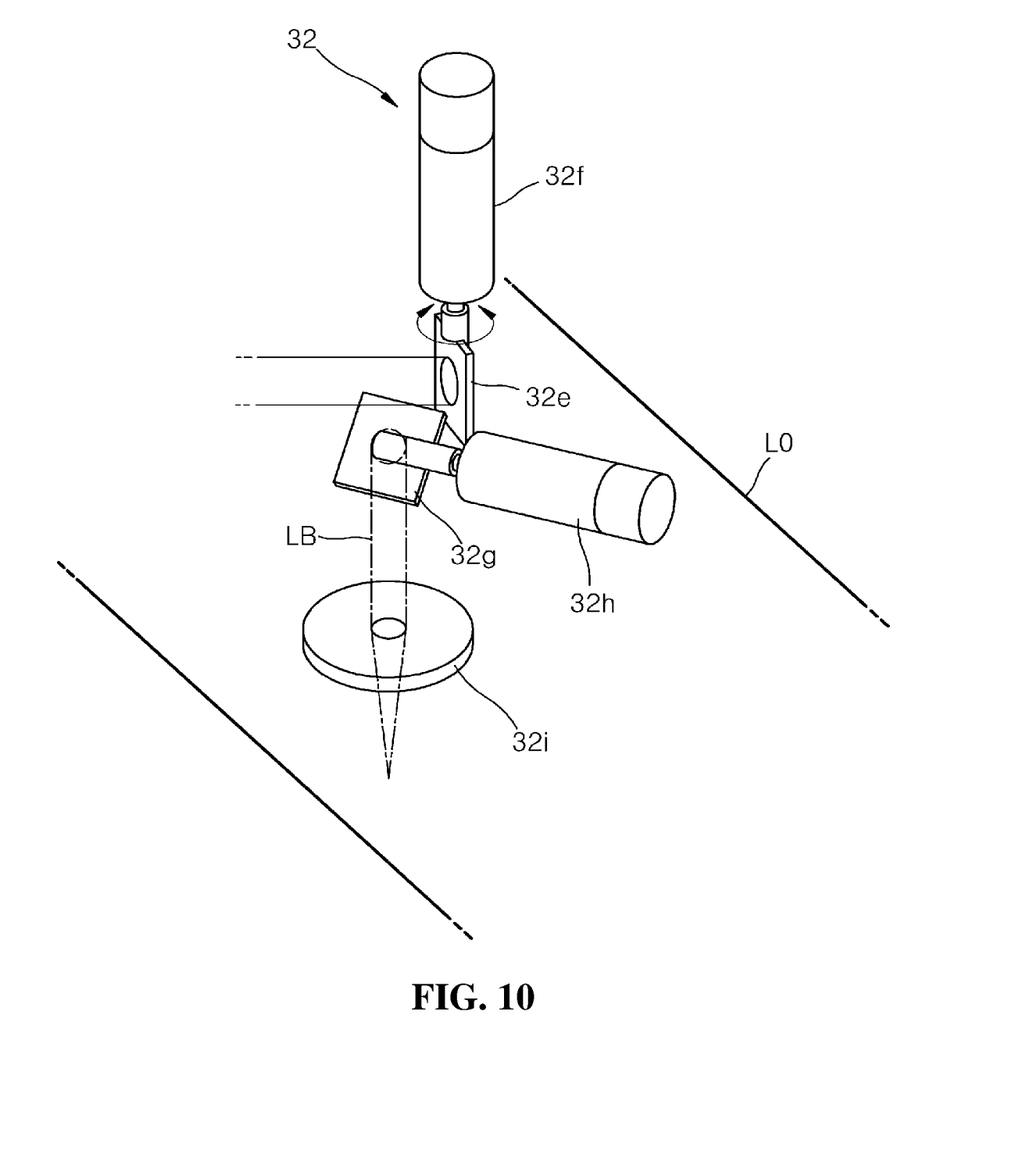
FIG. 10 is a diagram for describing a laser etching device for forming the concavo-convex patterns according to the present disclosure.

FIG. 10 is a diagram for describing a laser etching device for forming the concavo-convex patterns according to the present disclosure.

A laser etching device may be installed between a supply unit and a cutting unit so as to perform a laser etched pattern formation process on a lead tab material roll LO.

In some cases, the laser etching device may be installed between the cutting unit and a loading box so as to perform a laser marking process on a lead tab.

The laser etching device is configured to laser-mark laser etched patterns P on the top and bottom surfaces of the lead tab material roll LO.

For example, the laser etching device may include a first marking machine 32 for laser-marking the laser-etched patterns on the top surface of a predetermined laser etched pattern processing area of the lead tab material roll LO, and a second marking machine for laser-marking the laser etched patterns on the bottom surface of the laser etched pattern processing area of the lead tab material roll LO.

The installation position of the first marking machine 32 is not specifically limited. For example, the first marking machine 32 may be installed to emit laser beam LB onto the lead tab material roll LO transferred from a feeding roller, or specifically the top surface of a predetermined laser etched pattern processing area of the lead tab material roll LO located between a first conveyer belt and a second conveyer belt.

The installation position of the second marking machine is not specifically limited. For example, the second marking machine may be installed to emit laser beam LB onto the lead tab material roll LO having passed through the first marking machine 32, or specifically the bottom surface of a predetermined laser etched pattern processing area of the lead tab material roll LO located between the second conveyer belt and a third conveyer belt.

The first marking machine 32 may include a first laser oscillator configured to generate and oscillate the laser beam LB, a first laser scanner configured to emit the laser beam LB, transferred from the first laser oscillator, onto a predetermined scan area, a first scanner driver configured to reciprocate the first laser scanner in the widthwise direction of the lead tab material roll LO, and one or more first reflecting mirrors installed between the first laser oscillator and the first laser scanner and configured to transfer the laser beam LB oscillated by the first laser oscillator to the first laser scanner.

The second marking machine may include a second laser oscillator configured to generate and oscillate the laser beam LB, a second laser scanner configured to emit the laser beam LB, transferred from the second laser oscillator, onto the predetermined scan area, a second scanner driver configured to reciprocate the second laser scanner in the widthwise direction of the lead tab material roll LO, and one or more second reflecting mirrors installed between the second laser oscillator and the second laser scanner and configured to transfer the laser beam LB oscillated by the second laser oscillator to the second laser scanner.

The first marking machine 32 and the second marking machine have the same structure except the locations onto which the first and second marking machines emit the laser beams LB. Thus, hereafter, the first marking machine 32 will be taken as an example for describing the structures of the marking machines.

The first laser oscillator generates and oscillates the laser beam LB capable of laser-processing the lead tab material roll LO. For example, when the lead tab material roll LO is made of synthetic resin, the first laser oscillator may generate and oscillate $CO_2$ laser beam LB having a wavelength of 9.3 μm or 10.6 μm.

The first laser scanner is configured to adjust an optical path of the laser beam LB transferred through the first reflecting mirror from the first laser oscillator, such that the laser beam LB can be emitted onto the predetermined scan area. For example, as illustrated in FIG. 10, the first laser scanner may include an X-axis mirror 32e and a Y-axis mirror 32g. The X-axis mirror 32e may be driven by an X-axis servo motor 32f, and may be configured to change the optical path of the laser beam LB in the widthwise direction, and the Y-axis mirror 32g may be driven by a Y-axis servo motor 32h, and may be configured to change the optical path of the laser beam LB in a longitudinal direction. The laser beam LB whose optical path has been changed by the X-axis mirror 32e and the Y-axis mirror 32g may be concentrated by a lens 32i included in the first laser scanner, and emitted onto the lead tab material roll LO. The lens 32i may be an f-theta (θ) lens, but is not limited thereto.

The laser etched pattern processing area is one area of the lead tab material roll LO, on which a surface treatment is to be performed through a laser marking process, and is set to the position to which an insulating film for sealing the interface between the lead tab and a battery case is fused. Such a processing area may be set with a predetermined reference spacing on the lead tab material roll LO, such that each of the lead tabs divided from the lead tab material roll LO by the cutting unit includes the laser etched patterns. The reference spacing is not specifically limited. For example, the reference spacing may correspond to a length L of the lead tab.

The lead tab having the concavo-convex patterns according to the present disclosure may be applied to a pouch-type secondary battery.

The pouch-type secondary battery may include a battery case serving as a pouch-type exterior material, an electrode assembly housed in the battery case, a lead tab electrically connected to electrode tabs of electrodes included in the electrode assembly and extended to the outside of the battery case, and an insulating film configured to electrically insulate the lead tab.

In particular, the insulating film may have one surface fused to the lead tab and the other surface opposite to the one surface and fused to the battery case, and may perform a function of sealing the interface between the lead tab and the battery case serving as a pouch-type exterior material.

The lead tab may be made of a metallic material such as aluminum (Al) or copper (Cu), the insulating film may be made of synthetic resin such as polypropylene, and the battery case serving as a pouch-type exterior material may be made of synthetic resin and may include a synthetic resin layer fused with the insulating film.

Therefore, the concavo-convex patterns of the lead tab according to the present disclosure may increase the bonding and fusion area with the insulating film, thereby improving the fusion or bonding performance between the insulating film and the lead tab.

According to the present disclosure, the plurality of concavo-convex patterns for increasing the surface area of the lead tab may be formed by treating the surface of the lead tab with external energy, and thus improve the fusion performance between the lead tab and the insulating film without using a chemical, which makes it possible to minimize the environmental pollution and the defect rate while raising the productivity.

Furthermore, the concavo-convex patterns may be formed on the surface of the processing area of the lead tab, to which the insulating film is fused or bonded, such that the surface area of the fused or bonded surface of the lead tab is increased, which makes it possible to improve the fusion or bonding performance between the insulating film and the processing area of the lead tab.

Furthermore, when the insulating films are fused or bonded, bubbles formed at the interfaces between the insulating films and the processing area of the lead tab may be discharged to the outside through the concavo-convex patterns, which makes it possible to prevent the bubbles from being contained in the interfaces.

The above-described features, structures, and effects of the present disclosure are included in one or more embodiments of the present disclosure, and are not limited only to one embodiment. Furthermore, the combinations and modifications of the features, structures, and effects exemplified in the embodiments may be carried out in other embodiments by those skilled in the art to which the embodiments pertain. Therefore, it should be construed that the contents related to such combinations and modifications are included in the scope of the present disclosure.

Although the present disclosure has been described with reference to the embodiments, the embodiments are only illustrative, and do not intend to limit the present disclosure. The person skilled in the art to which the present disclosure pertains will appreciate that various modifications and applications not exemplified above are possible without departing from the essential features of the embodiments. For example, the components particularly included in the embodiments may be modified. Furthermore, it should be construed that differences related to such modifications and applications are included in the scope of the present disclosure, defined in the following claims.

What is claimed is:

1. A lead tab for a secondary battery, comprising:
a metal plate;
a plurality of concavo-convex patterns formed on a surface of the metal plate between an end and a central region of the metal plate; and
an insulating film bonded to the surface of the metal plate, on which the plurality of concavo-convex patterns is located,
wherein the plurality of concavo-convex patterns are formed through a surface treatment of applying predetermined laser light energy onto the surface of the metal plate, and comprise first concavo-convex patterns formed by applying the laser light energy having a first output value onto a first area of the front surface of the metal plate, and second concavo-convex patterns formed by applying the laser light energy having a second output value onto a second area of the rear surface of the metal plate,
wherein the first and second concavo-convex pattern are formed so that the concavo-convex patterns adjacent to each other have a spacing of 0.001 mm to 0.5 mm, and the spacings between the concavo-convex patterns adjacent to each other gradually decrease from a central region toward either edge region in a predetermined region of the metal plate, while the depths of the concavo-convex patterns gradually increase from the central region toward the either edge region in the predetermined region of the metal plate,
an area occupied by the concavo-convex patterns ranges from 10% to 95% of the entire area of the metal plate,
the concavo-convex patterns are formed with a depth ranging from 1% to 80% of the thickness of the metal plate,
an area occupied by the first concavo-convex patterns formed on the first area of the front surface of the metal plate is different from an area occupied by the second concavo-convex patterns formed on the second area of the rear surface of the metal plate, and
a spacing between the first concavo-convex pattern is different from a spacing between the second concavo-convex pattern.

2. The lead tab of claim 1, wherein the laser light energy has an output value decided on the basis of the material of the metal plate, and the surface of the metal plate is treated with the laser light energy having the decided output value.

3. The lead tab of claim 2, wherein the surface of the metal plate is treated with the laser light energy having a first output value when the metal plate is made of a single metal, and the surface of the metal plate is treated with the laser light energy having a second output value when the metal plate is made of a composite metal.

4. The lead tab of claim 1, wherein the laser light energy has an output value decided on the basis of preset surface roughness of the metal plate, and the surface of the metal plate is treated with the laser light energy having the decided output value.

* * * * *